(12) United States Patent
Gandal et al.

(10) Patent No.: US 10,826,982 B2
(45) Date of Patent: Nov. 3, 2020

(54) PACKET PROCESSING ARCHITECTURE AND METHOD THEREFOR

(71) Applicants: Stefania Gandal, Hertzelia (IL); Noam Efrati, Beer Sheva (IL); Adi Katz, Ramat Gan (IL)

(72) Inventors: Stefania Gandal, Hertzelia (IL); Noam Efrati, Beer Sheva (IL); Adi Katz, Ramat Gan (IL)

(73) Assignee: NXP USA, Inc., Austin, TX (US)

( * ) Notice: Subject to any disclaimer, the term of this patent is extended or adjusted under 35 U.S.C. 154(b) by 601 days.

(21) Appl. No.: 14/655,168

(22) PCT Filed: Jan. 10, 2013

(86) PCT No.: PCT/IB2013/050219
§ 371 (c)(1),
(2) Date: Jun. 24, 2015

(87) PCT Pub. No.: WO2014/108748
PCT Pub. Date: Jul. 17, 2014

(65) Prior Publication Data
US 2015/0341429 A1 Nov. 26, 2015

(51) Int. Cl.
*H04L 29/08* (2006.01)
*H04L 12/933* (2013.01)

(52) U.S. Cl.
CPC ........ *H04L 67/104* (2013.01); *H04L 49/1546* (2013.01); *H04L 69/321* (2013.01)

(58) Field of Classification Search
CPC combination set(s) only.
See application file for complete search history.

(56) References Cited

U.S. PATENT DOCUMENTS

| | | | |
|---|---|---|---|
| 6,263,422 B1 | 7/2001 | Wise et al. | |
| 7,330,468 B1 | 2/2008 | Tse-Au | |
| 7,512,129 B1* | 3/2009 | Favor | H04L 49/557 370/394 |
| 7,529,239 B2 | 5/2009 | Seppanen | |
| 8,020,168 B2 | 9/2011 | Hoover et al. | |
| 2003/0046429 A1* | 3/2003 | Sonksen | G06F 15/17337 709/246 |
| 2007/0183415 A1* | 8/2007 | Fischer | H04L 49/3009 370/389 |
| 2009/0097406 A1 | 4/2009 | Nilakantan et al. | |
| 2009/0285228 A1 | 11/2009 | Bagepalli et al. | |
| 2009/0310610 A1 | 12/2009 | Sandstrom | |
| 2011/0080916 A1 | 4/2011 | Davies et al. | |
| 2012/0140640 A1 | 6/2012 | Lee et al. | |

OTHER PUBLICATIONS

International Search Report and Written Opinion correlating to PCT/IB2013/050219 dated Oct. 16, 2013.
Freescale "QorIQ Data Path Acceleration Architecture (DPAA) Reference Manual". Rev. 2, Nov. 2011.
Supplementary European Search Report dated Nov. 2016 for corresponding EP 13870564, 7 pages.

* cited by examiner

*Primary Examiner* — Yee F Lam

(57) ABSTRACT

A packet processing architecture includes a plurality of packet processing stages, wherein at least one of the packet processing stages includes multiple next processing stage modules that are operably coupled to respective further processing stages, wherein the multiple next processing stage modules are dynamically configurable.

12 Claims, 4 Drawing Sheets

PACKET PROCESSING ARCHITECTURE AND METHOD THEREFOR

FIELD OF THE INVENTION

The field of this invention relates to a packet processing architecture and a method therefor.

BACKGROUND OF THE INVENTION

Generally, in computer networking, processors operate in a sequential manner, whereby instructions are executed on data packets one by one. A packet is a formatted unit of data carried by a packet mode computer network. Various techniques are used to improve performance; with hardware acceleration being one of them. Properly implemented acceleration logic can provide performance advantages over most optimized software applications with acceleration factors on the order of 10-100 times. Hardware accelerators within a computer network are generally fixed or programmable functional hardware that can improve power or performance significantly when compared to software running on a general purpose central processing unit (CPU). The use of hardware accelerators is common for widely used functions such as floating-point computation and video decoding.

Within computer networks, and in particular within the architecture of all major central processing units (CPUs), the concept of pipelining to forward data packets is known, as illustrated in stages 102-116 of FIG. 1. In a computing context, a pipeline is a set of packet processing elements connected in series, so that the output of one element is the input of the next one. The elements of a pipeline are often executed in parallel or in a time-sliced fashion. Pipelining is known to provide higher efficiency in utilization of network resources, which enables accommodating a larger amount of traffic on the network, thereby lowering operational cost. Pipelining is also known to support low implementation complexity, which enables the realization of more powerful, scalable networking systems, thereby offering further support to network growth. In a given application, as a result of data packet classification, different data packets may traverse a different stage in the pipeline.

When a data packet is received in a computing network, it is generally processed by a frame manager module in several stages. FIG. 1 illustrates an example of how a frame manager module 100 may process a data packet in a specific order. The frame manager module 100 comprises a first buffer manager interface (BMI) stage 102, receiving incoming data from internal memory, operably coupled to Parser stage 104. Parser stage 104 parses data, identifies network layers and generates results to be used by subsequent processing stages. A further stage 106 steers the processing flow for subsequent stages. A frame manager controller stage 108 combines different interfaces with data packet distribution logic to distribute data within the frame manager module 100. The frame manager controller stage 108 is operably coupled to policer stage 110, which prioritises and polices data traffic based on various computer algorithms and transmit results to a second BMI 112. The second BMI 112 is generally configured to enqueue or drop the transmitted data from the policer stage 110. A queue manager interface (QMI) 114 is operably coupled to second BMI 112, and is generally operable to generate frame enqueue requests to a queue manager (not shown). A third BMI 116 is operably coupled to QMI 114, and is operable to release all internal resources from buffers. Thus, FIG. 1 illustrates a known sequential processing of data packets in a computer network.

At the end of its operation, a number of frame manager stages 102-116 may dispatch a user-programmable next processing stage (NPS) code, which may be used by the frame manager module's hardware to determine the next stage in the processing pipeline. In this way, the frame manager module 100 may allow a user to configure the pipeline stages 102-116, thereby allowing each application to perform different functions on the received data packets.

Generally, when a data packet is received from a computing network, it is processed by a number of processing modules in several stages. FIG. 2 illustrates a plurality of processing modules 200, wherein a packet of data is processed in stages 201 in a specific order. These stages 201 effectively form a pipeline 202 that a given packet of data transverses sequentially. As shown, the same stages 201 of the pipeline 202 may be arranged to operate in parallel 203, thereby allowing the processing of multiple data packets at the same time. One typical example of the serial/sequential processing of packet data encompasses the steps of: receiving the data packet, parsing the data packet, classifying the data packet, enqueueing the data packet and releasing the data packet.

Furthermore, it is known that the addition of NPS registers 204 may allow a user to configure the pipeline stages 201, thereby allowing each application to perform different functions on the data packets. This is referred to as a 'configurable pipeline architecture'.

After each processing module 200 has completed its operation, the processing module 200 dispatches a user programmable NPS action code 205, which is used by a scheduler (not shown), located in the configurable pipelined architecture in order to determine the next stage to be executed in the pipeline 202 after the current processing stage. Thus, the NPS register 204 is the mechanism that allows a user to configure the pipeline 202.

Hence, packet data flows from one stage to the next in a specific order. The processing of packet data in such fixed pipeline hardware architecture has been found to be restrictive, particularly when trying to support a very high speed (10-100 Gbps) packet processing engine.

SUMMARY OF THE INVENTION

The present invention provides a packet processing architecture and a method therefor as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Examples of the invention provide for a packet processing architecture comprising a plurality of packet processing stages, wherein at least one of the packet processing stages comprises multiple next processing stage modules that are operably coupled to respective further processing stages, wherein the multiple next processing stage modules are dynamically configurable.

Hence, examples of the invention provide for a dynamically configurable data packet processing architecture that allows packet data flows from a first stage to any subsequent stage in a user-configurable manner.

In some examples, multiple packet processing stages may comprise multiple next processing stage modules. In some examples, at least one of the packet processing stages may be arranged to process a received data packet passing there through and, in response thereto, dynamically configure at least one of the multiple next processing stage modules operably coupled thereto. In some examples, the packet processing stages may be arranged to process the received data packet passing there through to determine a processing stage of the received data packet.

Figure 1:
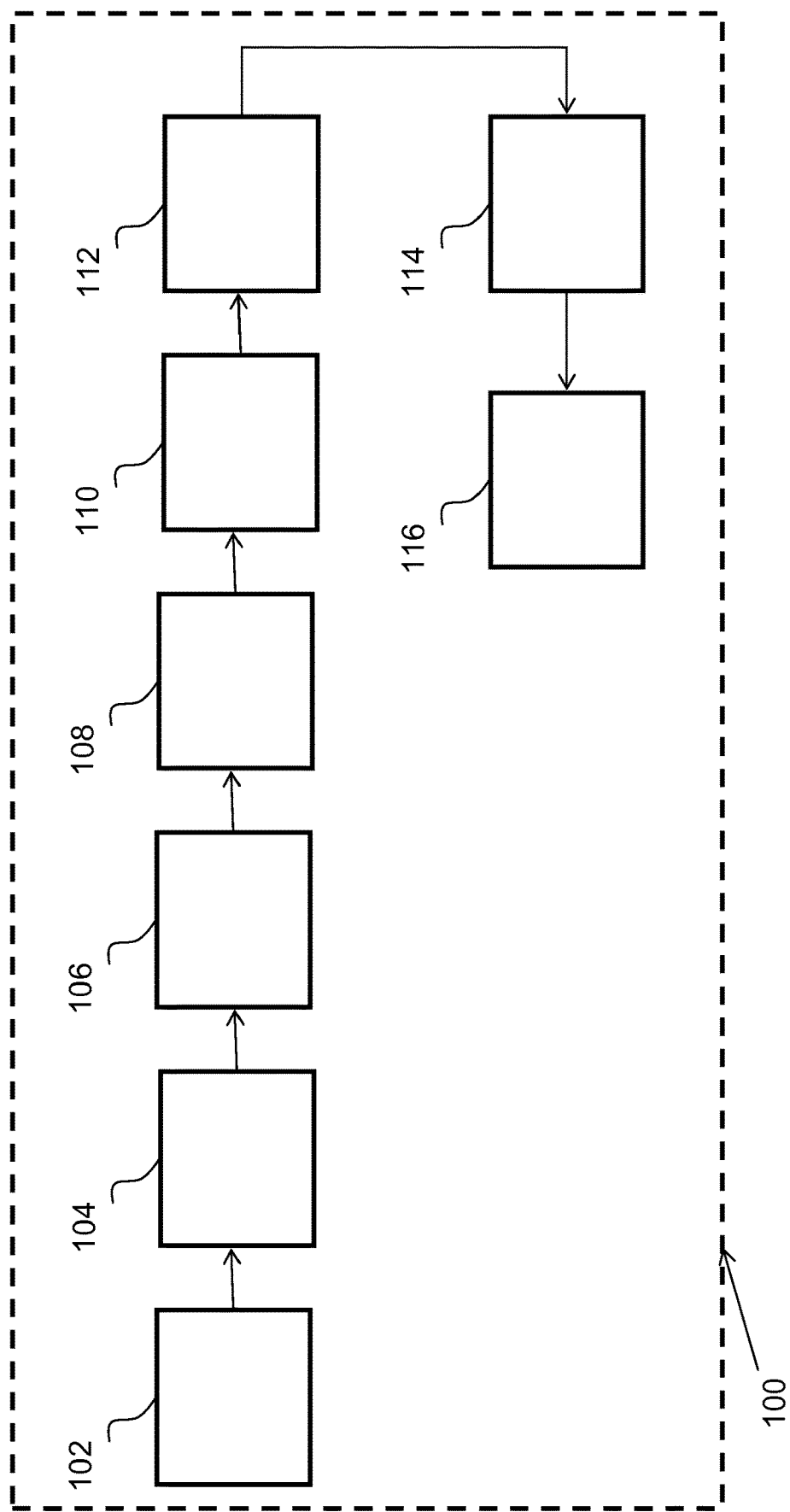
FIG. 1 illustrates a frame manager module processing a data packet.

In some examples, the at least one of the packet processing stages may be arranged to process the received data packet passing there through to determine content of the received data packet. In some examples, processing the received data packet may comprise performing a stateful examination of the data packet content. In some examples, the at least one of the multiple next processing stage modules may be arranged to feedback a received data packet to one or more previous processing stages. In some examples, the at least one of the multiple next processing stage modules may form a repeat feedback loop between processing stages. In some examples, the dynamic reconfiguration of the plurality of packet processing stages, which may be in a form of a pipeline, may allow bypassing/skipping of one or more packet processing stages, and/or feedback to one or more previous packet processing stages. In some examples, the dynamically configurable data packet processing architecture supports feedback loops, which in some examples may be repeat feedback loops between any of the stages, for example in a very high speed (10-25 Gbps) packet processing engine. Repeat feedback loops are advantageous as they allow, among other things, greater flexibility than the known pipeline architecture shown in FIG. 1 and FIG. 2. In some examples, at least one of the multiple next processing stage modules is arranged to bypass one or more processing stages.

Examples of the invention also provide a method for a packet processing architecture comprising a plurality of packet processing stages. At least one of the packet processing stages may comprise multiple next processing stage modules. The method comprises dynamically configuring at least one of the next processing stage modules to route a data packet to one of the plurality of data stages.

Figure 3:
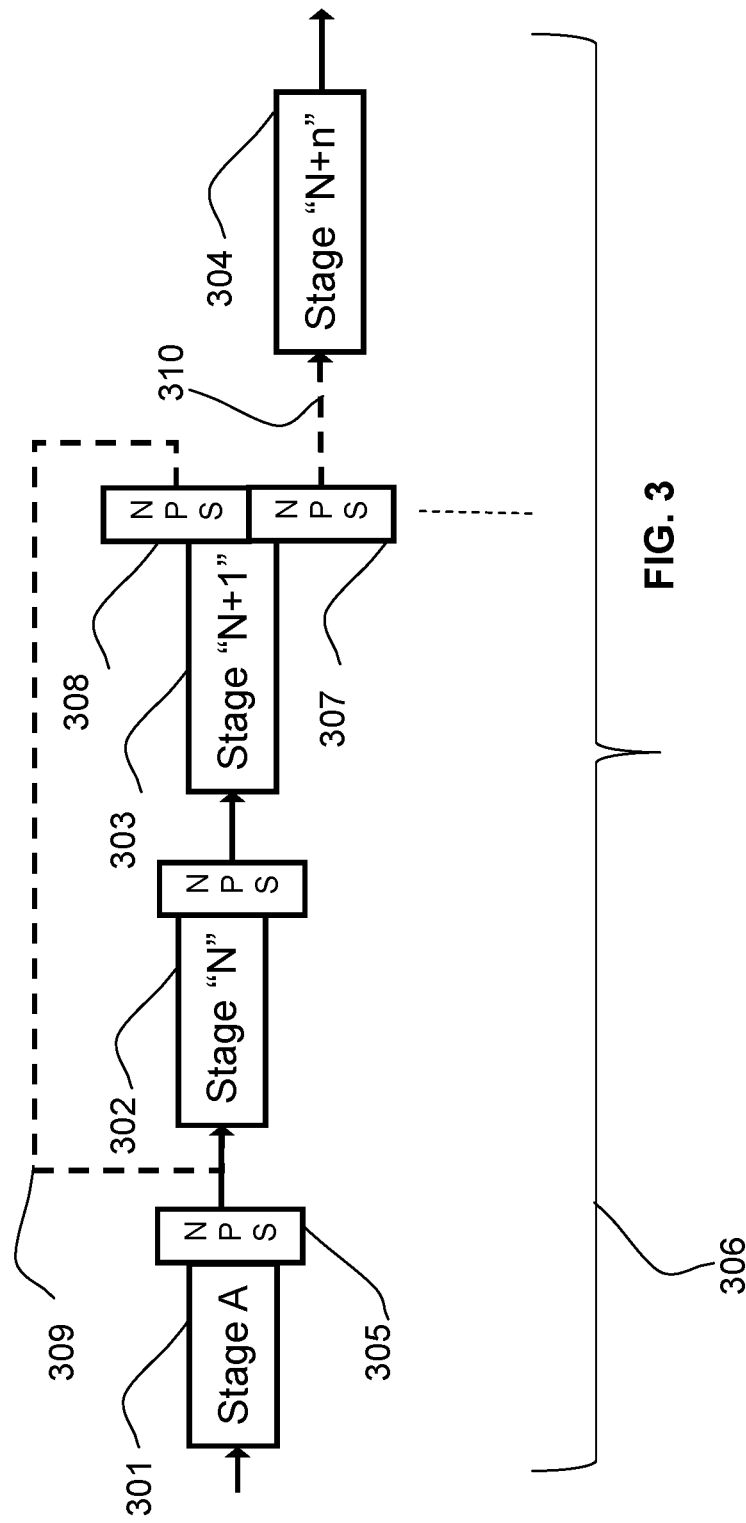
FIG. 3 illustrates an example of a simplified block diagram of a plurality of processing modules.

Referring to FIG. 3, there is illustrated an example of a simplified block diagram of a plurality of processing modules utilising aspects of the invention comprising, a plurality of processing stages 301, 302, 303, 304, each operably coupled to at least one 'next processing stage' (NPS) register 305, forming dynamic reconfigurable pipeline 306. In examples of the invention, the structure of the NPS may be implemented in any suitable form, for example hardware, firmware, logic, software, etc. or any combination thereof.

Figure 2:
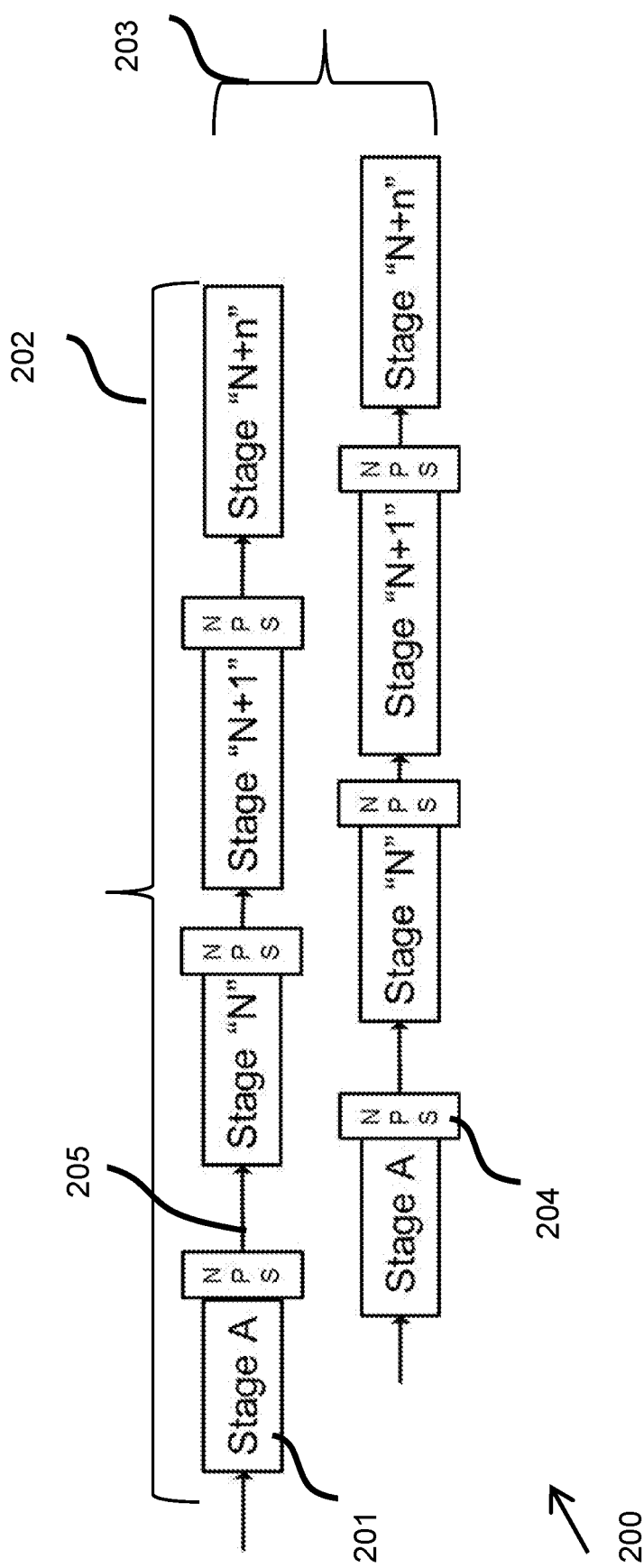
FIG. 2 illustrates a simplified block diagram of a plurality of processing modules, where a packet of data is processed in stages.

Although the illustrated example shows a single dynamically reconfigurable pipeline 306, in other examples multiple parallel dynamically reconfigurable pipelines may be employed. In contrast to a standard configurable pipeline as illustrated in FIG. 2, where each processing stage 201 comprises a single NPS register 204, the illustrated example utilises multiple configurable NPS registers 307, 308 per processing stage.

In the example of FIG. 3, processing stage 303 comprises two NPS registers 307 and 308, although any number of NPS registers 305 may be implemented into the dynamic reconfigurable pipeline 306. In this example, only one processing stage 303 has a plurality of NPS registers. However, any of processing stages 301, 302, 304 within the dynamic reconfigurable pipeline 306 may also be implemented with any number of NPS registers 305.

In the illustrated example, processing stage 303 is operable to dynamically evaluate (at wire-speed), for example from an output of an earlier stage of the pipeline, such as a classifier, e.g. on one example it may be (packet data) traffic dependent, which NPS register (e.g. NPS register 307 or NPS register 308) should be utilised for the next stage of the dynamic reconfigurable pipeline 306.

In one example, the processing stages 301, 302, 304 may apply a stateful examination of the packet content of data passing there through.

In the illustrated example, the processing stage 303 may apply a stateful examination of the packet content of data passing there through, such that the processing of the packet content of the data will determine how the data packet is subsequently processed, for example which of two or more paths may be selected. For example, processing stage 303 may decide on the next NPS stage 307, 308 to route the data packet to, by applying one or more criteria to the processed data. In some examples, the decision on the next NPS stage to route the data packet to may be made, based on a processing state of the packet flow. In this illustrated example, dependent upon, say, a stateful examination of the packet content of data passing there through and/or a processing state of the packet flow (e.g. what processing steps have previously been performed), processing stage 303 may route the data packet via NPS register 308 and thereafter via feedback loop 309 between processing stage 303 and processing stage 302 within the dynamic reconfigurable pipeline 306. In some examples, one or more feedback loops 309 may be a repeat feedback loop (where the feedback routing of the data packet may be repeated, say, a particular number of times or until a particular processing state of the data packet is achieved).

In this illustrated example, dependent upon, say, a stateful examination of the packet content of data passing there through and/or a processing state of the packet flow (e.g. what processing steps have previously been performed), processing stage 303 may alternatively or subsequently route the data packet via NPS register 307 and thereafter via processing stage "N+n" 304 within the dynamic reconfigurable pipeline 306.

In other examples, one or more of the NPS registers may be used to bypass one or more subsequent processing stages (not shown), dependent upon, say, a stateful examination of the packet content of data passing there through and/or a processing state of the packet flow (e.g. what processing steps have previously been performed).

In other examples, or perhaps when the feedback repeat loop has been performed a desired number of times, NPS register 307 may be utilised, thereby forming an operable connection 310 from processing stage 303 to processing stage 304. In this manner, by processing data packets passing there through and, in response thereto, the pipeline 306 is able to dynamically reconfigure itself in real time since the sequence of the pipeline stages is not pre-wired in hardware (as in known architectures). This is in contrast to the existing known art of software configurability, whereby processing functionality at such processing rates, is provided using fixed pipelines.

Figure 4:
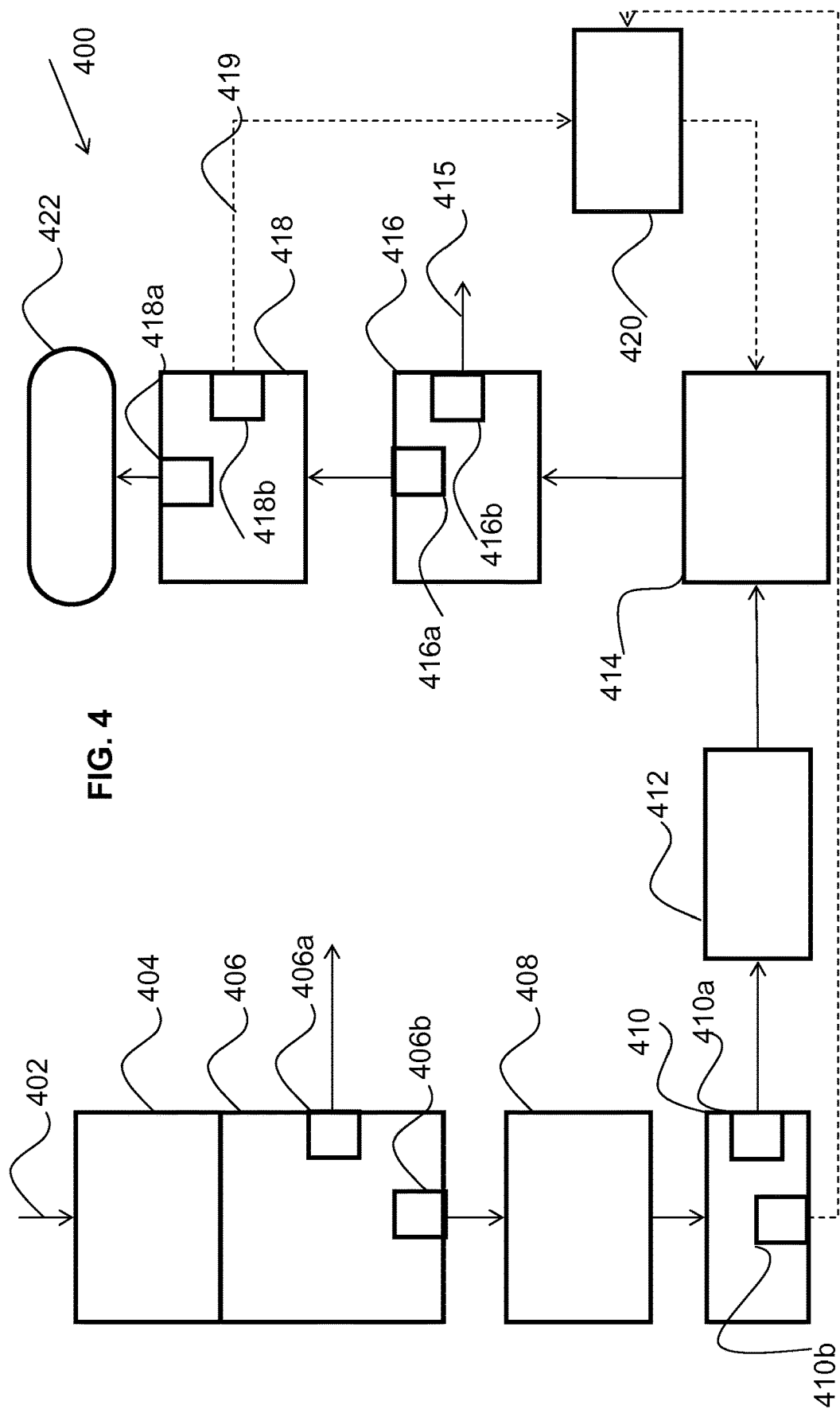
FIG. 4 illustrates a simplified example block diagram of a dynamically reconfigurable pipeline architecture.

Referring to FIG. 4, there is illustrated a simplified example block diagram of a dynamically reconfigurable pipeline architecture 400 utilising aspects of the invention. The dynamically reconfigurable pipeline architecture 400 comprises, frame manager 404 arranged to receive data input 402. Frame manager 404 is operably coupled to buffer manager interface (BMI) 406. In this example, frame manager block 404 is operable to combine different interfaces with packet distribution logic for dynamic distribution of incoming traffic at a line rate of 10-25 Gbps, for example, and 'push' this received data into the BMI 406. In this example, BMI 406 may be operable to store incoming data from the frame manager 404 in internal memory. The BMI 406 may be further operable to generate direct memory access (DMA) transactions to store a part of the received data 402 in buffers allocated by the BMI 406.

BMI 406 comprises multiple configurable NPS registers 406a, 406b and, in this example is operably coupled to parser module 408 and configured to pass received data thereto. The parser module 408 is operable to parse many standard protocols, including options and tunnels, and is operable to support generic configurable capability to allow proprietary or future protocols to be parsed. In this example, the parser module 408 is operable to parse data and identify network layers, generate results to be used by subsequent processing blocks and configure an NPS register to direct data to a classify module 410.

Classify module 410 also comprises multiple configurable NPS registers 410a, 410b and, in this example is operable to generate information, and can steer data to either frame manager controller 420 or policer module 412. The policer module 412 is operable to prioritize and police data traffic based on, in this example, a two-rate, three-colour marking algorithm. In this way, the policer module 412 is operable to rate-limit traffic to conform to a predetermined rate value. The policer module 412 is operable to transmit data to a second BMI module 414.

A queue manager interface (QMI) 416 is operably coupled to second BMI module 414 and also comprises multiple configurable NPS registers 416a, 416b. In this example, second BMI module 414 is operable to receive a NPS register value. This register value may cause the second BMI module 414 to either discard data or prepare data to be enqueued. If the result is for data to be enqueued, the second BMI module 414 is operable to copy buffer data from frame manager 404 to external memory (not shown) and invokes the QMI module 416.

In this example, the QMI module 416 is operable to generate a frame enqueue request 415 to a queue manager (not shown). A further NPS register value may be generated and used to direct data to third BMI module 418. In this example, third BMI module 418 releases all internal resources from buffers.

In this example, dynamic reconfigurable pipeline 419 has been configured by at least one NPS register, to enable a repeat loop between the third BMI module 418 and second BMI module 414. In this example, the number of repeat loops 419 may be dynamically determined by the content or the size of the data being processed.

In examples of the invention, the number of loops and the positioning of the dynamic reconfigurable pipeline may be located anywhere within the architecture 400. In this example, the dynamic reconfigurable pipeline saves DDR bandwidth, which could be utilised instead for reading back data before further processing. In this example, each block in architecture 400 has at least one NPS register (not shown).

In this example, the at least one NPS register dynamically reconfigures the pipeline at wire speed in order to determine the next stage in the pipeline.

In this example, an effect of the dynamic reconfigurable pipelines is that processor architecture (for example that was not known during a design phase of the architecture) may be implemented after fabrication without physical modification. Due to the utilisation of dynamic reconfigurable pipelines in this example, there is no longer a need to involve software to reconfigure data flow.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples, for example each of the plurality of processing stages, may be implemented as circuitry located on a single integrated circuit or within a same device. Alternatively, the examples may be implemented as any number of separate integrated circuits or separate devices interconnected with each other in a suitable manner.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A packet processing architecture comprising a plurality of packet processing stages arranged in series to form a pipeline for processing packets, wherein at least one of the packet processing stages comprises multiple next processing stage modules that are operably coupled to respective further packet processing stages, wherein the at least one of the packet processing stages comprises a first next processing stage register and a second next processing stage register, the first next processing stage register and the second next processing stage register connected to different packet processing stages of the plurality of packet processing stages, and wherein the at least one of the packet processing stages dynamically evaluates which one of the first and second next processing stage registers should be utilised by processing a received data packet to determine content of the received data packet and performing a stateful examination of the content, and selects one of the first and second next processing stage registers for utilization based on the processing.

2. The packet processing architecture of claim 1 wherein the at least one of the packet processing stages is arranged to dynamically configure at least one of the first next processing stage register and the second next processing stage register in response to processing the received data packet.

3. The packet processing architecture of claim 1 wherein the at least one of the packet processing stages is arranged to process the received data packet passing there through to determine a packet processing stage of the received data packet.

4. The packet processing architecture of claim 1 wherein the at least one of the multiple next processing stage modules is arranged to feedback a received data packet to one or more previous packet processing stages of the plurality of packet processing stages.

5. The packet processing architecture of claim 4 wherein the at least one of the multiple next processing stage modules forms a repeat feedback loop between packet processing stages of the plurality of packet processing stages.

6. The packet processing architecture of claim 1 wherein the at least one of the multiple next processing stage modules is arranged to bypass one or more packet processing stages of the plurality of packet processing stages.

7. A method for a packet processing architecture comprising a plurality of packet processing stages arranged in series to form a pipeline for processing packets, wherein at least one of the packet processing stages comprises multiple next processing stage modules, a first next processing stage register and a second next processing stage register, the first next processing stage register and the second next processing stage register connected to different packet processing stages of the plurality of packet processing stages, the method comprising:

the at least one of the packet processing stages dynamically evaluating which of the first and second next processing stage registers should be utilised by processing a received data packet to determine content of the received data packet, and selecting one of the first and second next processing stage registers for utilization based on the content.

8. The method of claim 7, further comprising dynamically configuring at least one of the first next processing stage register and the second next processing stage register in response to processing the received data packet.

9. The method of claim 7 wherein processing the received data packet passing through comprises determining a processing stage of the received data packet.

10. The method of claim 7 further comprising feeding back a received data packet to one or more previous packet processing stages of the plurality of packet processing stages.

11. The method of claim 7 further comprising forming a repeat feedback loop between packet processing stages of the plurality of packet processing stages.

12. The method of claim 7 further comprising bypassing one or more packet processing stages of the plurality of packet processing stages.

\* \* \* \* \*